(12) United States Patent
Sano et al.

(10) Patent No.: US 11,177,757 B2
(45) Date of Patent: Nov. 16, 2021

(54) POWER CONVERSION DEVICE

(71) Applicants: Mitsubishi Electric Corporation, Tokyo (JP); National University Corporation Nagaoka University of Technology, Nagaoka (JP)

(72) Inventors: Sota Sano, Tokyo (JP); Akira Satake, Tokyo (JP); Kiyoshi Ohishi, Niigata (JP); Yuki Yokokura, Niigata (JP); Tenjiro Hiwatari, Niigata (JP)

(73) Assignees: MITSUBISHI ELECTRIC CORPORATION, Tokyo (JP); NATIONAL UNIVERSITY CORPORATION NAGAOKA UNIVERSITY OF TECHNOLOGY, Nagaoka (JP)

(*) Notice: Subject to any disclaimer, the term of this patent is extended or adjusted under 35 U.S.C. 154(b) by 0 days.

(21) Appl. No.: 16/754,755

(22) PCT Filed: Dec. 7, 2017

(86) PCT No.: PCT/JP2017/043984
§ 371 (c)(1),
(2) Date: Apr. 9, 2020

(87) PCT Pub. No.: WO2019/111372
PCT Pub. Date: Jun. 13, 2019

(65) Prior Publication Data
US 2021/0203261 A1 Jul. 1, 2021

(51) Int. Cl.
*H02P 27/06* (2006.01)
*H02P 21/22* (2016.01)
*H02M 7/5387* (2007.01)

(52) U.S. Cl.
CPC ........ *H02P 27/06* (2013.01); *H02M 7/53871* (2013.01); *H02P 21/22* (2016.02)

(58) Field of Classification Search
CPC ...... H02P 27/06; H02P 21/22; H02M 7/53871
See application file for complete search history.

(56) References Cited

U.S. PATENT DOCUMENTS

2006/0125435 A1 6/2006 Geyer et al.

FOREIGN PATENT DOCUMENTS

| JP | 08-33399 A | 2/1996 |
|---|---|---|
| JP | 2006-174697 A | 6/2006 |

(Continued)

OTHER PUBLICATIONS

International Search Report and Written Opinion dated Feb. 27, 2018 for PCT/JP2017/043984 filed on Dec. 7, 2017, 6 pages including English Translation of the International Search Report.

*Primary Examiner* — Cortez M Cook
(74) *Attorney, Agent, or Firm* — Xsensus LLP

(57) ABSTRACT

The present invention includes a control amount calculation unit which calculates two or more control amounts each indicating a driving condition of a rotary electric machine on the basis of output current from and a switching state in a power converter; a limitation range-provided command value generation unit which generates limitation range-provided command values relative to command values for the control amounts; and a switching state determination unit which determines a switching state such that each control amount falls within the limitation range of the corresponding limitation range-provided command value. For at least one of the limitation range-provided command values, the limitation range thereof is temporally changed on the basis of the driving condition of the rotary electric machine.

17 Claims, 19 Drawing Sheets

(56) References Cited

FOREIGN PATENT DOCUMENTS

| JP | 2013-172573 A |   | 9/2013  |
|----|---------------|---|---------|
| JP | 2013172573 A  | * | 9/2013  |
| JP | 2015-223023 A |   | 12/2015 |
| JP | 2015223023 A  | * | 12/2015 |

* cited by examiner

FIG. 8

| $\Psi \; \tau$ | $\theta e$ | $\theta 1$ | $\theta 2$ | $\theta 3$ | $\theta 4$ | $\theta 5$ | $\theta 6$ |
|---|---|---|---|---|---|---|---|
| | $\tau = -1$ | V5 | V6 | V1 | V2 | V3 | V4 |
| $\Psi = 0$ | $\tau = 0$ | V0 | V7 | V0 | V7 | V0 | V7 |
| | $\tau = 1$ | V3 | V4 | V5 | V6 | V1 | V2 |
| | $\tau = -1$ | V6 | V1 | V2 | V3 | V4 | V5 |
| $\Psi = 1$ | $\tau = 0$ | V7 | V0 | V7 | V0 | V7 | V0 |
| | $\tau = 1$ | V2 | V3 | V4 | V5 | V6 | V1 |

|  | U | V | W |
|---|---|---|---|
| V0 | 0 | 0 | 0 |
| V1 | 1 | 0 | 0 |
| V2 | 1 | 1 | 0 |
| V3 | 0 | 1 | 0 |
| V4 | 0 | 1 | 1 |
| V5 | 0 | 0 | 1 |
| V6 | 1 | 0 | 1 |
| V7 | 1 | 1 | 1 |

POWER CONVERSION DEVICE

CROSS-REFERENCE TO RELATED APPLICATIONS

The present application is based on PCT filing PCT/JP2017/043984, filed Dec. 7, 2017, the entire contents of which are incorporated herein by reference.

TECHNICAL FIELD

The present invention relates to a direct torque control type power conversion device used for rotary electric machines, particularly, electric motors.

BACKGROUND ART

As control for driving a multi-phase AC rotary electric machine, instantaneous current control in which a switching state in a power conversion device is directly calculated on the basis of the state (current, torque, rotation rate, or the like) of the rotary electric machine, is conventionally known. "Direct torque control" is known as a type of the instantaneous current control, and a method for determining a switching state in a power conversion device with use of a switching table is disclosed (for example, Patent Document 1).

In this method, the switching state, i.e., switching loss, for use in the "direct torque control" is determined with use of the table. However, for a complex operation or a device for driving a plurality of types of rotary electric machines, a problem arises in that design for the table is complicated.

To solve the problem, the following method is disclosed: a method in which model predictions predict, for application of each of switching states, the state of a motor, and the optimal switching state is determined on the basis of an evaluation function (for example, Patent Document 2).

In this method, control can be performed without design for any table, and an effect of reducing switching loss is also expected.

CITATION LIST

Patent Document

Patent Document 1: Japanese Laid-Open Patent Publication No. 8-33399 (paragraphs [0013] to [0018], and FIG. 1)

Patent Document 2: Japanese Laid-Open Patent Publication No. 2006-174697 (paragraphs [0023] to [0033], and FIGS. 2 and 3)

SUMMARY OF THE INVENTION

Problems to be Solved by the Invention

Here, in the direct torque control disclosed in each of Patent Documents 1 and 2, torque and rotor interlinkage magnetic flux of the rotary electric machine are used as control amounts. When model predictions are combined with one another, output currents such as currents in a two-axis orthogonal rotating coordinate system are sometimes used as the control amounts. A pulsating quantity included in each of these control amounts greatly varies according to the driving condition of the rotary electric machine.

In addition, the relationship between the driving condition of the rotary electric machine and variation in the pulsating quantity is different among two or more control amounts. In view of this, the direct torque control involves setting a predetermined allowable pulsation range for each of command values and performing switching control such that the corresponding control amount falls within the range.

In general, as the allowable pulsation range is widened, the number of times of switching per unit time decreases, whereby the switching loss in the switching element can be reduced. Meanwhile, the pulsation of the control amount increases, and this increase causes torque ripple in or noise from the rotary electric machine. Therefore, the allowable pulsation range is set in consideration of both the switching loss and a control-target pulsation component, and a trade-off relationship is established therebetween.

However, the pulsating quantity included in each control amount is variable. Thus, when the pulsating quantity of one of the control amounts is small, the other control amount exceeds the allowable pulsation range first. Accordingly, the pulsation of the one of the control amounts is less than the allowable pulsation range. In this case, the one of the control amounts sometimes remains approximately at the upper limit or the lower limit of the allowable range. As a result, a problem arises in that the one of the control amounts is outputted as a value that is different from the command value.

If the allowable pulsation range is narrowed to avoid the problem, another problem arises in that the number of times of switching extremely increases when the pulsating quantity of the control amount is large.

The present invention has been made to solve the above problems, and aims to provide a power conversion device capable of causing a control amount to follow a command value while reducing a switching frequency.

Solution to the Problems

A power conversion device according to the present invention is a power conversion device including a power converter which supplies power that drives a rotary electric machine by a switching operation of a switching element, the power conversion device further including a controller for the power converter, the controller including: a control amount calculation unit which calculates two or more control amounts each indicating a driving condition of the rotary electric machine on the basis of output current from the power converter and a switching state of the switching element of the power converter; a limitation range-provided command value generation unit which generates limitation range-provided command values including limitation ranges for pulsations of the control amounts relative to command values for the control amounts; and a switching state determination unit which determines a switching state on the basis of each control amount and the corresponding limitation range-provided command value such that the control amount falls within the limitation range of the limitation range-provided command value, wherein, for at least one of the limitation range-provided command values, the limitation range of the limitation range-provided command value is temporally changed on the basis of the driving condition of the rotary electric machine.

Effect of the Invention

The power conversion device according to the present invention includes: the limitation range-provided command value generation unit which generates limitation range-provided command values including limitation ranges for pulsations of the control amounts relative to command values for the control amounts; and the switching state determination unit which determines a switching state on the basis of each control amount and the corresponding limitation range-provided command value such that the control amount falls within the limitation range of the limitation range-provided command value, wherein, for at least one of the limitation range-provided command values, the limitation range of the limitation range-provided command value is temporally changed on the basis of the driving condition of the rotary electric machine. Accordingly, it is possible to inhibit errors between the command values and output values from occurring owing to variations, in the pulsating quantities of the control amounts, that occur according to the driving condition of the rotary electric machine, and it is possible to suppress increase in the switching frequency by avoiding occurrence of such errors without narrowing the limitation ranges for the pulsations.

BRIEF DESCRIPTION OF THE DRAWINGS

FIG. 8 is a diagram for explaining a switching table in the switching state determination unit of the power conversion device according to Embodiment 1 of the present invention.

DESCRIPTION OF EMBODIMENTS

Embodiment 1

Embodiment 1 relates to a power conversion device including: a current detector which detects currents in a rotary electric machine; a control amount calculation unit which calculates two or more control amounts for controlling the rotary electric machine on the basis of the detected currents and a switching state in a power converter; a phase calculation unit which calculates a phase of a stator interlinkage magnetic flux which is one of the control amounts; a limitation range-provided command value generation unit which generates limitation range-provided command values relative to command values for the respective control amounts; and a switching state determination unit which determines a switching state on the basis of each control amount, the phase of the stator interlinkage magnetic flux, and the corresponding limitation range-provided command value such that the control amount falls within a limitation range, wherein, for at least one of the command values, the limitation range of the corresponding limitation range-provided command value is temporally changed.

Hereinafter, a configuration and an operation of the power conversion device according to Embodiment 1 of the present invention will be described with reference to FIG. 1 which is a function block diagram of the power conversion device, FIG. 2 which is a hardware configuration diagram, FIG. 3 which is a diagram indicating phase regions for a stator interlinkage magnetic flux, FIG. 4 which is a diagram indicating examples of limitation range-provided command values relative to command values for control amounts, FIG. 5 which is an internal block diagram of the switching state determination unit, FIG. 6 which is a diagram for explaining hysteresis characteristics in a torque comparator, FIG. 7 which is a diagram for explaining hysteresis characteristics in a magnetic flux comparator, FIG. 8 which is a diagram for explaining a switching table, and FIG. 9 which is a diagram for explaining voltage vectors.

The entire configuration and the function of the power conversion device according to Embodiment 1 will be described with reference to FIG. 1 to FIG. 9. First, an internal configuration of a power conversion device 1 will be described with reference to FIG. 1. Next, a configuration example of hardware for realizing the power conversion device 1 will be described with reference to FIG. 2. Then, a function of each constituent block of the power conversion device and a function of the entire power conversion device will be described with reference to FIG. 1 to FIG. 9.

Figure 1:
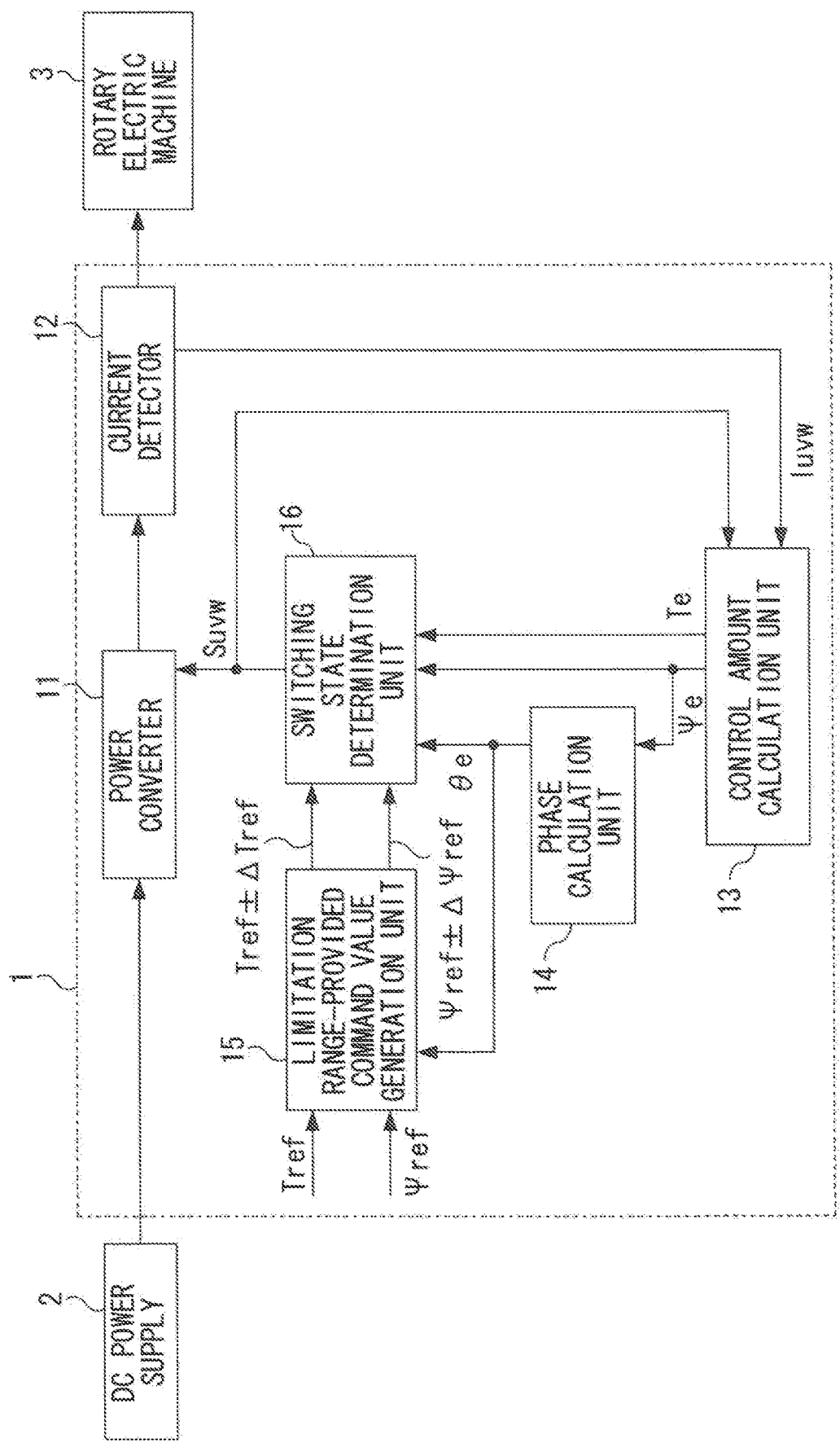
FIG. 1 is a function block diagram of a power conversion device according to Embodiment 1 of the present invention.
Figure 2:
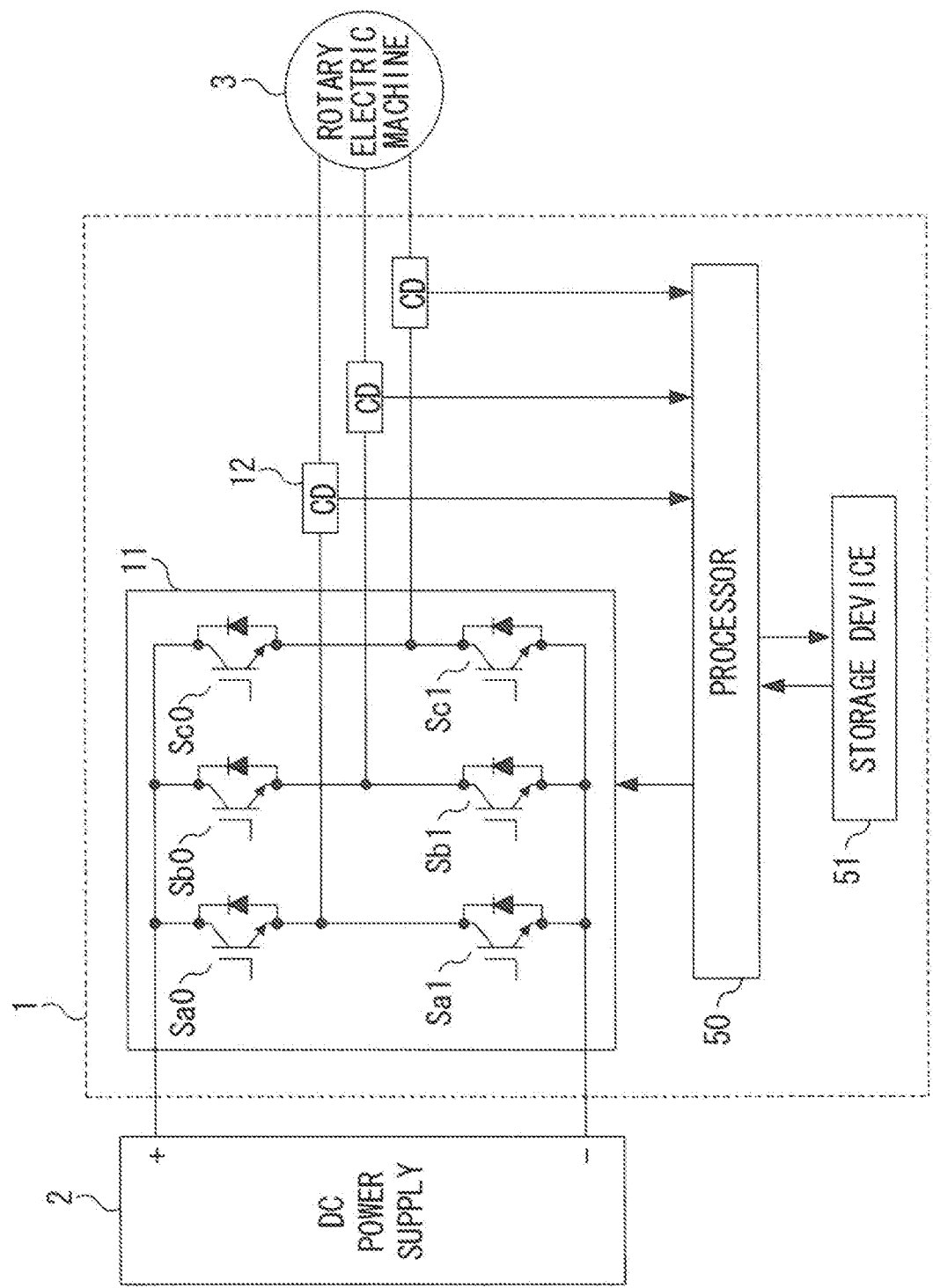
FIG. 2 is a hardware configuration diagram of the power conversion device according to Embodiment 1 of the present invention.

In FIG. 1, a power conversion device system is composed of the power conversion device 1, a DC power supply 2, and a rotary electric machine 3.

The power conversion device 1 includes a power conversion section and a control section.

The power conversion section of the power conversion device 1 includes a power converter 11. The control section of the power conversion device 1 includes a current detector 12, a control amount calculation unit 13, a phase calculation unit 14, a limitation range-provided command value generation unit 15, and a switching state determination unit 16.

Next, a configuration example of hardware for realizing the function of the power conversion device 1 will be described with reference to FIG. 2.

The power conversion device 1 includes, as hardware, the power converter 11, a processor 50 which controls the power converter 11, a storage device 51 for the processor 50, and current detectors 12. In FIG. 2, the current detectors 12 are written as "CD".

The power converter 11 is composed of six sets of switching elements and diodes. The power converter 11 converts DC power from the DC power supply 2 into three-phase AC power, and drives the rotary electric machine 3 such as an electric motor which is a load. In FIG. 2, the switching elements are written as Sa0, Sa1, Sb0, Sb1, Sc0, and Sc1.

The processor 50 executes a program received from the storage device 51. The storage device 51 includes an auxiliary storage device and a volatile storage device, and the program is inputted from the auxiliary storage device via the volatile storage device to the processor 50. The processor 50 may output data such as a calculation result to the volatile storage device of the storage device 51, or may save calculation result data in the auxiliary storage device via the volatile storage device.

Next, a function of each constituent block of the power conversion device 1 and a function of the entire power conversion device 1 will be described with reference to FIG. 1 to FIG. 9.

The power converter 11 converts power supplied from the DC power supply 2 into AC power on the basis of a switching state Suvw determined by the switching state determination unit 16, and supplies the AC power to the rotary electric machine 3.

The rotary electric machine 3 converts the AC power obtained through the conversion by the power converter 11, into drive force. Although the rotary electric machine described herein is assumed to be an electric motor, another type of rotary electric machine may be used.

The current detector 12 detects three-phase AC currents between the power converter 11 and the rotary electric machine 3 and inputs the detected currents as Iuvw to the control amount calculation unit 13. Any current detector such as a CT (current transformer) detector or a shunt resistor may be used as the current detector 12. Alternatively, currents for two phases may be detected so that current for the remaining one phase can be calculated. Alternatively, a one-shunt current detection method in which three-phase AC currents are recovered with one detector may be employed.

The control amount calculation unit 13 calculates present values of control amounts on the basis of the currents Iuvw detected by the current detector 12 and the switching state Suvw determined by the switching state determination unit 16, and inputs the present values to the phase calculation unit 14 and the switching state determination unit 16. Here, a torque Te and a stator interlinkage magnetic flux $\Psi e$ are calculated as the control amounts. The torque Te is inputted to the switching state determination unit 16, and the stator interlinkage magnetic flux $\Psi e$ is inputted to the phase calculation unit 14 and the switching state determination unit 16.

The phase calculation unit 14 calculates a phase $\theta e$ of the stator interlinkage magnetic flux from the stator interlinkage magnetic flux $\Psi e$ calculated by the control amount calculation unit 13, and inputs the phase $\theta e$ to the limitation range-provided command value generation unit 15 and the switching state determination unit 16.

Figure 3:
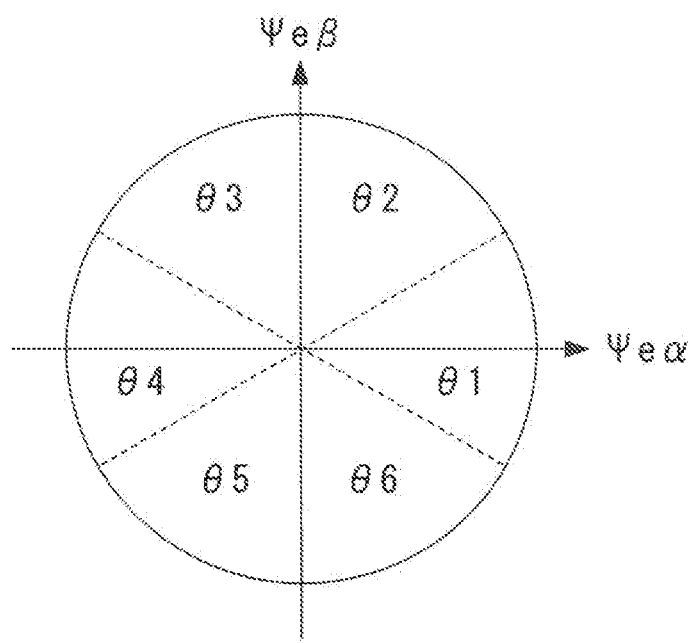
FIG. 3 is a diagram indicating phase regions for a stator interlinkage magnetic flux in the power conversion device according to Embodiment 1 of the present invention.

As shown in FIG. 3, the phase calculation unit 14 performs coordinate conversion on the stator interlinkage magnetic flux $\Psi e$ into $\Psi e\alpha$ and $\Psi e\beta$ in a stationary coordinate system, and specifies which of regions $\theta(1)$ to $\theta(6)$ $\Psi e\alpha$ and $\Psi e\beta$ belong to.

Figure 4:
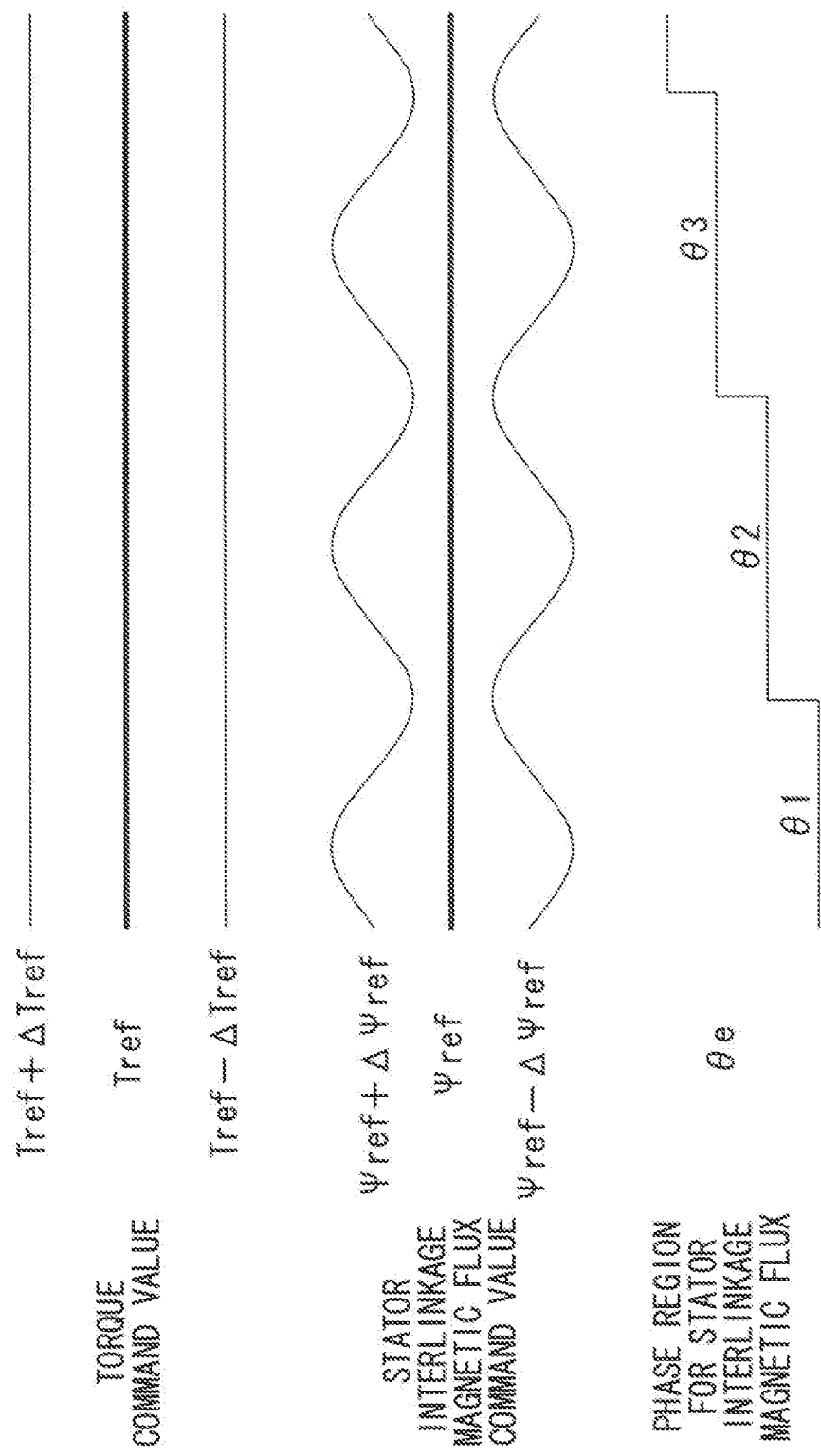
FIG. 4 is a diagram indicating examples of limitation range-provided command values relative to command values for control amounts in the power conversion device according to Embodiment 1 of the present invention.

In FIG. 3, FIG. 4, and FIG. 8, $\theta(1)$ is written as $\theta 1$ and $\theta(6)$ is written as $\theta 6$, for example.

The limitation range-provided command value generation unit 15 generates limitation range-provided command values from command values for the control amounts, and inputs the limitation range-provided command values to the switching state determination unit 16. FIG. 1 illustrates a case where a torque and a stator interlinkage magnetic flux are used as the control amounts. In FIG. 1, Tref±ΔTref and $\Psi ref\pm\Delta\Psi ref$ which are limitation range-provided command values obtained by respectively providing limitation ranges ΔTref and $\Delta\Psi ref$ to a torque command value Tref and a stator interlinkage magnetic flux command value $\Psi ref$, are inputted to the switching state determination unit 16.

FIG. 4 illustrates examples of the limitation range-provided command values. As shown in FIG. 4, the limitation range ΔTref for the torque command value Tref does not change over time. Meanwhile, the limitation range $\Delta\Psi ref$ for the stator interlinkage magnetic flux command value $\Psi ref$ temporally changes on the basis of the phase $\theta e$ of the stator interlinkage magnetic flux calculated by the phase calculation unit 14.

Specifically, the limitation range $\Delta\Psi ref$ for the stator interlinkage magnetic flux command value is narrow around a switch point between the phase regions, i.e., a point at which switching from $\theta(1)$ to $\theta(2)$ is made, and the limitation range $\Delta\Psi ref$ for the stator interlinkage magnetic flux command value is wide at the center of each phase region.

In FIG. 4, the limitation range for the stator interlinkage magnetic flux command value is changed in a sinusoidal manner. However, it is also possible to change only the limitation range for the torque command value. Alternatively, it is possible to change the limitation ranges for both the stator interlinkage magnetic flux command value and the torque command value.

In FIG. 4, the limitation range is changed in a sinusoidal manner. However, the manner of the change is not limited to a sinusoidal manner, either.

Which control amount the limitation range is to be changed, is determined according to variation in the pulsation of each control amount. For example, if the rotation speed of the rotary electric machine is low, variation in the pulsation of the stator interlinkage magnetic flux is greater than variation in the pulsation of the torque, and thus it is preferable to temporally change only the limitation range of the stator interlinkage magnetic flux. Meanwhile, if the rotation speed of the rotary electric machine is high, variation in the pulsation of the torque also becomes great, and thus it is preferable to temporally change the limitation ranges for the command values for both the stator interlinkage magnetic flux and the torque.

The switching state determination unit 16 determines a switching state Suvw on the basis of the torque Te and the stator interlinkage magnetic flux Ψe calculated by the control amount calculation unit 13, the phase θe of the stator interlinkage magnetic flux calculated by the phase calculation unit 14, and the limitation range-provided torque command value Tref±ΔTref and the limitation range-provided stator interlinkage magnetic flux command value Ψref±ΔΨref generated by the limitation range-provided command value generation unit 15.

Figure 5:
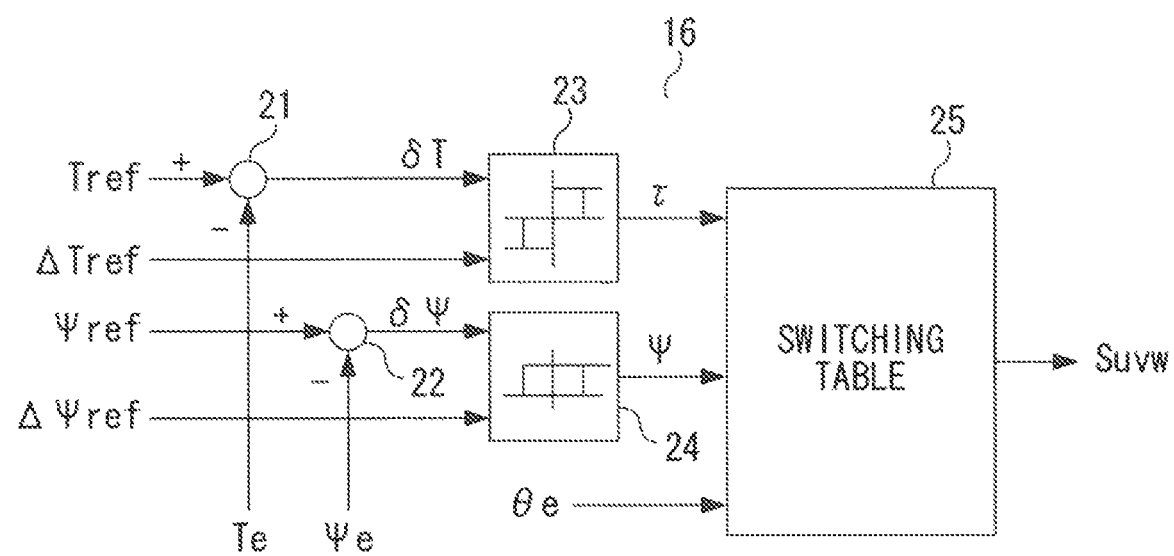
FIG. 5 is an internal block diagram of a switching state determination unit of the power conversion device according to Embodiment 1 of the present invention.

FIG. 5 shows an internal block diagram for explaining a function of the switching state determination unit 16.

The switching state determination unit 16 includes subtractors 21 and 22, a torque comparator 23, and a magnetic flux comparator 24.

The difference δT between the torque command value Tref and the torque Te calculated by the subtractor 21 is inputted to the torque comparator 23.

Meanwhile, the difference δΨ between the stator interlinkage magnetic flux command value Ψref and the stator interlinkage magnetic flux Ψe calculated by the subtractor 22 is inputted to the magnetic flux comparator 24.

Figure 6:
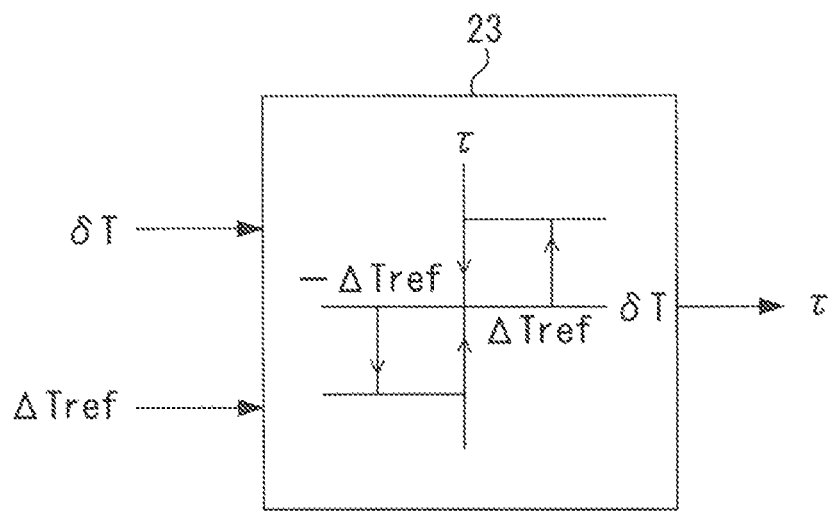
FIG. 6 is a diagram for explaining hysteresis characteristics in a torque comparator of the switching state determination unit of the power conversion device according to Embodiment 1 of the present invention.

FIG. 6 illustrates hysteresis characteristics in the torque comparator 23. A torque comparator output τ which is any of −1, 0, 1 is outputted on the basis of the difference δT and the limitation range ΔTref of the limitation range-provided torque command value calculated by the limitation range-provided command value generation unit 15.

Specifically, when the difference δT increases from 0 but is still less than ΔTref, the torque comparator output τ is 0. When δT becomes ΔTref or greater, the torque comparator output τ becomes 1. Then, the torque comparator output τ is kept at 1 until δT becomes less than 0. At the time point when δT becomes less than 0, the torque comparator output τ becomes 0.

The torque comparator output τ exhibits a similar characteristic also on the negative side.

Figure 7:
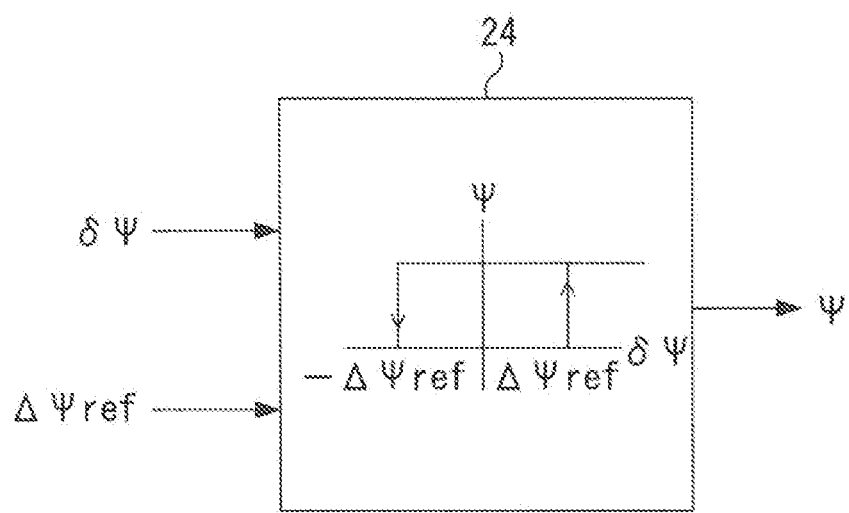
FIG. 7 is a diagram for explaining hysteresis characteristics in a magnetic flux comparator of the switching state determination unit of the power conversion device according to Embodiment 1 of the present invention.

FIG. 7 illustrates hysteresis characteristics in the magnetic flux comparator 24. A magnetic flux comparator output ψ which is either 0 or 1 is outputted on the basis of the difference δΨ and the limitation range ΔΨref of the limitation range-provided stator interlinkage magnetic flux command value calculated by the limitation range-provided command value generation unit 15.

Specifically, when the difference δΨ is ΔΨref or greater, 1 is outputted as the magnetic flux comparator output ψ. Then, the magnetic flux comparator output ψ is kept at 1 until δΨ becomes −ΔΨref. At the time point when δΨ becomes −ΔΨref or less, the magnetic flux comparator output ψ becomes 0.

When δΨ increases from −ΔΨref to ΔΨref, the magnetic flux comparator output ψ is 0.

The torque and magnetic flux comparator outputs τ and ψ and the phase θe of the stator interlinkage magnetic flux calculated by the phase calculation unit 14 are inputted to a switching table 25, and a switching state Suvw is outputted on the basis of the switching table 25.

FIG. 8 illustrates an example of the switching table. As shown in FIG. 8, one switching state is selected from among a total of eight switching states according to the combination of the torque and magnetic flux comparator outputs τ and ψ and the phase θe of the stator interlinkage magnetic flux. The switching states correspond to voltage vectors (V0 to V7).

When the selected switching state is inputted to the power converter 11, power from the DC power supply 2 is converted to a predetermined level of AC power, and the rotary electric machine 3 is driven.

Figures 9A, 9B:
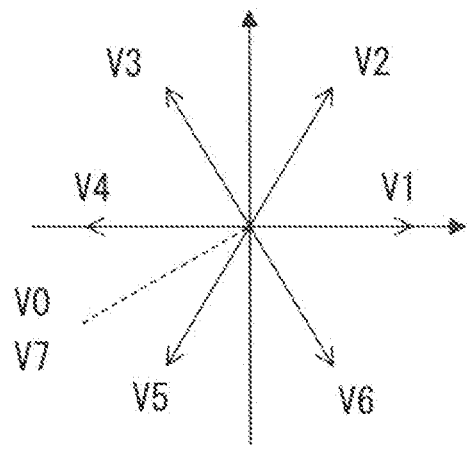
FIG. 9A is a diagram for explaining voltage vectors used for the switching table in the power conversion device according to Embodiment 1 of the present invention.
FIG. 9B is a diagram for explaining the voltage vectors used for the switching table in the power conversion device according to Embodiment 1 of the present invention.

FIG. 9 is a diagram for explaining the voltage vectors (V0 to V7). FIG. 9A indicates the voltage vectors (V0 to V7) in a simplified manner. FIG. 9B indicates switching states in the U, V, and W phases at the respective voltage vectors (V0 to V7). For example, in the U phase, the voltage vector V1 (100) indicates that the switching element Sa0 of the upper arm is ON and the switching element Sa1 of the lower arm is OFF. In the V phase, the voltage vector V1 (100) indicates that the switching element Sb0 of the upper arm is OFF and the switching element Sb1 of the lower arm is ON. In the W phase, the voltage vector V1 (100) indicates that the switching element Sc0 of the upper arm is OFF and the switching element Sc1 of the lower arm is ON.

In Embodiment 1, for the command value for at least either one of the torque and the stator interlinkage magnetic flux which are the control amounts, the width of the limitation range of the corresponding limitation range-provided command value is temporally changed on the basis of the driving condition of the rotary electric machine. Accordingly, the limitation range can be set to be wide at a point where variation in the control amount is large, whereas the limitation range can be set to be narrow at a point where the variation is small.

As a result, it is possible to inhibit an error of an output relative to the command value for each control amount from occurring when variation in one of the control amounts is larger or smaller than variation in the other control amount. Accordingly, it is possible to also suppress increase in a switching frequency necessary for avoiding increase in the error of the output. As a result, the rotary electric machine can be accurately driven according to the command values for the control amounts, and increase in switching loss can be suppressed.

In the specific example of Embodiment 1, the torque and the stator interlinkage magnetic flux are used as the control amounts, and the switching state in the power converter 11 is determined on the basis of the phase θe of the stator interlinkage magnetic flux. However, control amounts other than the torque and the stator interlinkage magnetic flux may be used. In addition, the switching state in the power converter 11 may be determined on the basis of a factor other than the phase θe of the stator interlinkage magnetic flux.

Specifically, the power conversion device 1 may be configured to include: the control amount calculation unit 13 which calculates two or more control amounts each indicating a driving condition of the rotary electric machine 3 on the basis of output current from the power converter 11 and a switching state of the switching elements Sa0 to Sc1; the limitation range-provided command value generation unit 15 which generates limitation range-provided command values including limitation ranges for pulsations of the control amounts relative to command values for the control amounts; and the switching state determination unit 16 which determines a switching state on the basis of each control amount and the corresponding limitation range-provided command value such that the control amount falls within the limitation range of the limitation range-provided command value, wherein, for at least one of the limitation range-provided command values, the limitation range of the limitation range-provided command value is temporally changed on the basis of the driving condition of the rotary electric machine 3.

With this configuration, it is possible to inhibit errors between the command values and output values from occurring owing to variations, in the pulsating quantities of the control amounts, that occur according to the driving condition of the rotary electric machine 3, and it is possible to suppress increase in the switching frequency by avoiding occurrence of such errors without narrowing the limitation ranges for the pulsations.

As described above, the power conversion device according to Embodiment 1 is a power conversion device including: the current detector which detects currents in the rotary electric machine; the control amount calculation unit which calculates two or more control amounts for controlling the rotary electric machine on the basis of the detected currents and a switching state in the power converter; the phase calculation unit which calculates a phase of a stator interlinkage magnetic flux which is one of the control amounts; the limitation range-provided command value generation unit which generates limitation range-provided command values relative to command values for the respective control amounts; and the switching state determination unit which determines a switching state on the basis of each control amount, the phase of the stator interlinkage magnetic flux, and the corresponding limitation range-provided command value such that the control amount falls within the limitation range, wherein, for at least one of the command values, the limitation range of the corresponding limitation range-provided command value is temporally changed.

Therefore, it is possible to inhibit errors between the command values and output values from occurring owing to variations, in the pulsating quantities of the control amounts, that occur according to the driving condition of the rotary electric machine, and it is possible to suppress increase in the switching frequency by avoiding occurrence of such errors without narrowing the limitation ranges for the pulsations.

Furthermore, because the torque and the stator interlinkage magnetic flux are used as the control amounts and the switching state in the power converter is determined on the basis of the phase of the stator interlinkage magnetic flux, the torque of the rotary electric machine can be directly controlled, and the rotary electric machine can be driven in consideration of the pulsation of the torque. In addition, the limitation range of the limitation range-provided command value can be changed in consideration of the pulsation of the control amount changing depending on the phase of the stator interlinkage magnetic flux.

Embodiment 2

A power conversion device according to Embodiment 2 is configured such that the switching state determination unit calculates loci for each voltage vector with use of an electric motor calculation model expression, calculates an evaluation value in consideration of the number of times of switching, and selects a switching state (voltage vector) at which the evaluation value becomes maximum.

Figure 10:
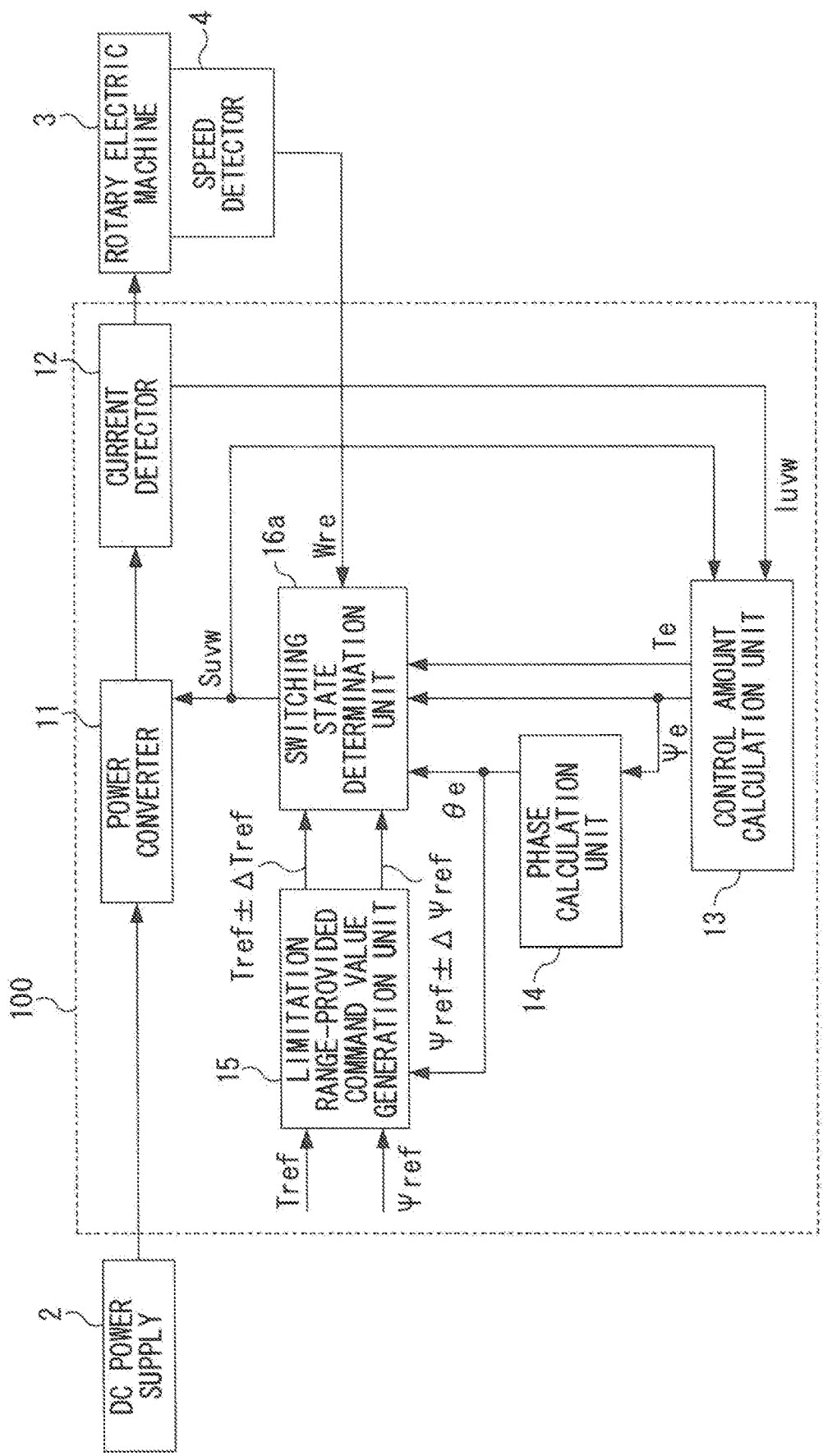
FIG. 10 is a function block diagram of a power conversion device according to Embodiment 2 of the present invention.

The power conversion device 100 according to Embodiment 2 will be described focusing on differences from Embodiment 1 with reference to FIG. 10 which is a function block diagram of the power conversion device, FIG. 11 which is an internal block diagram of the switching state determination unit, and FIG. 12 to FIG. 14 which are each a diagram for explaining a model prediction by the switching state determination unit. In FIG. 10, parts that are the same as or correspond to those in FIG. 1 for Embodiment 1 are denoted by the same reference characters.

The power conversion device and the switching state determination unit are denoted by 100 and 16a, respectively, for discrimination from those in Embodiment 1.

First, a configuration of the power conversion device 100 will be described with reference to FIG. 10.

The differences in configuration between the power conversion device 100 according to Embodiment 2 and the the power conversion device 1 according to Embodiment 1 are the switching state determination unit 16a and a speed detector 4 additionally provided. The other constituent blocks are the same as those in FIG. 1 for Embodiment 1, and thus description thereof is omitted.

First, the speed detector 4 detects the rotation speed of the rotary electric machine 3 and inputs the detected rotation speed to the switching state determination unit 16a. Here, any of speed detectors such as an encoder, a resolver, and a Hall sensor may be used as the speed detector 4.

In Embodiment 1, the switching state determination unit 16 determines a switching state to be outputted next, on the basis of the difference $\delta T$ between the torque Te and the torque command value Tref, the limitation range $\Delta$Tref for the torque command value, the difference $\delta\Psi$ between the stator interlinkage magnetic flux $\Psi$e and the stator interlinkage magnetic flux command value $\Psi$ref, the limitation range $\Delta\Psi$ref for the stator interlinkage magnetic flux command value, and the phase $\theta$e of the stator interlinkage magnetic flux.

Figure 11:
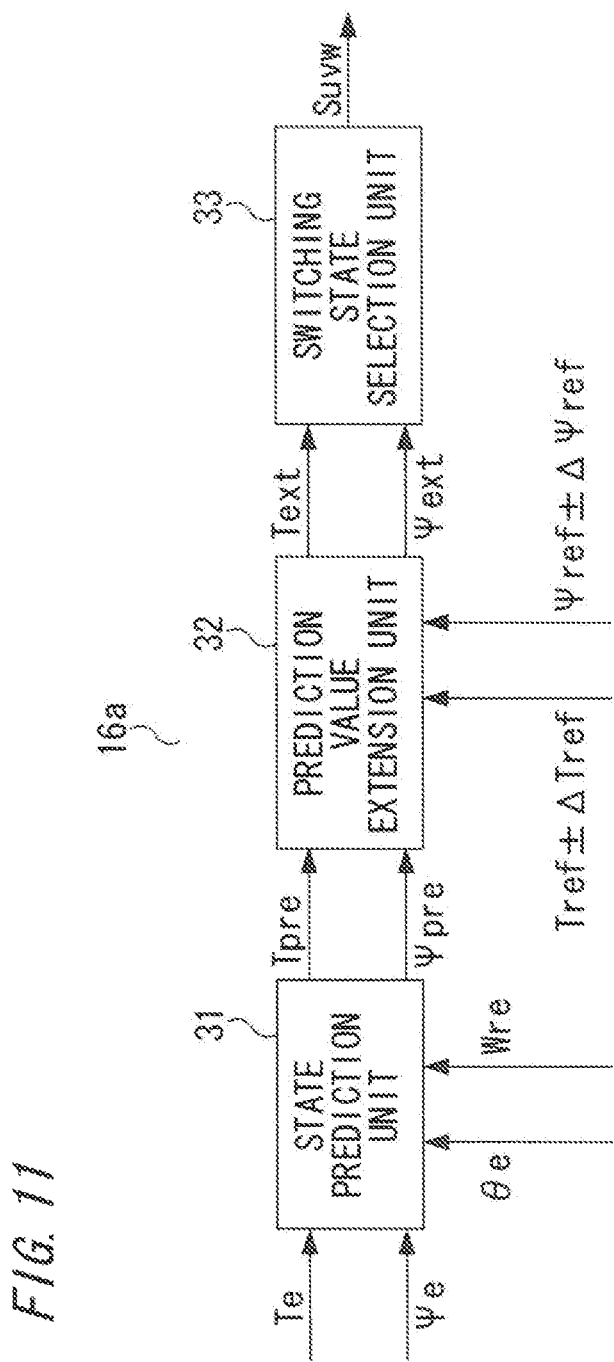
FIG. 11 is an internal block diagram of a switching state determination unit of the power conversion device according to Embodiment 2 of the present invention.

In Embodiment 2, as shown in the internal block diagram in FIG. 11, the switching state determination unit 16a includes a state prediction unit 31, a prediction value extension unit 32, and a switching state selection unit 33.

Figure 12:
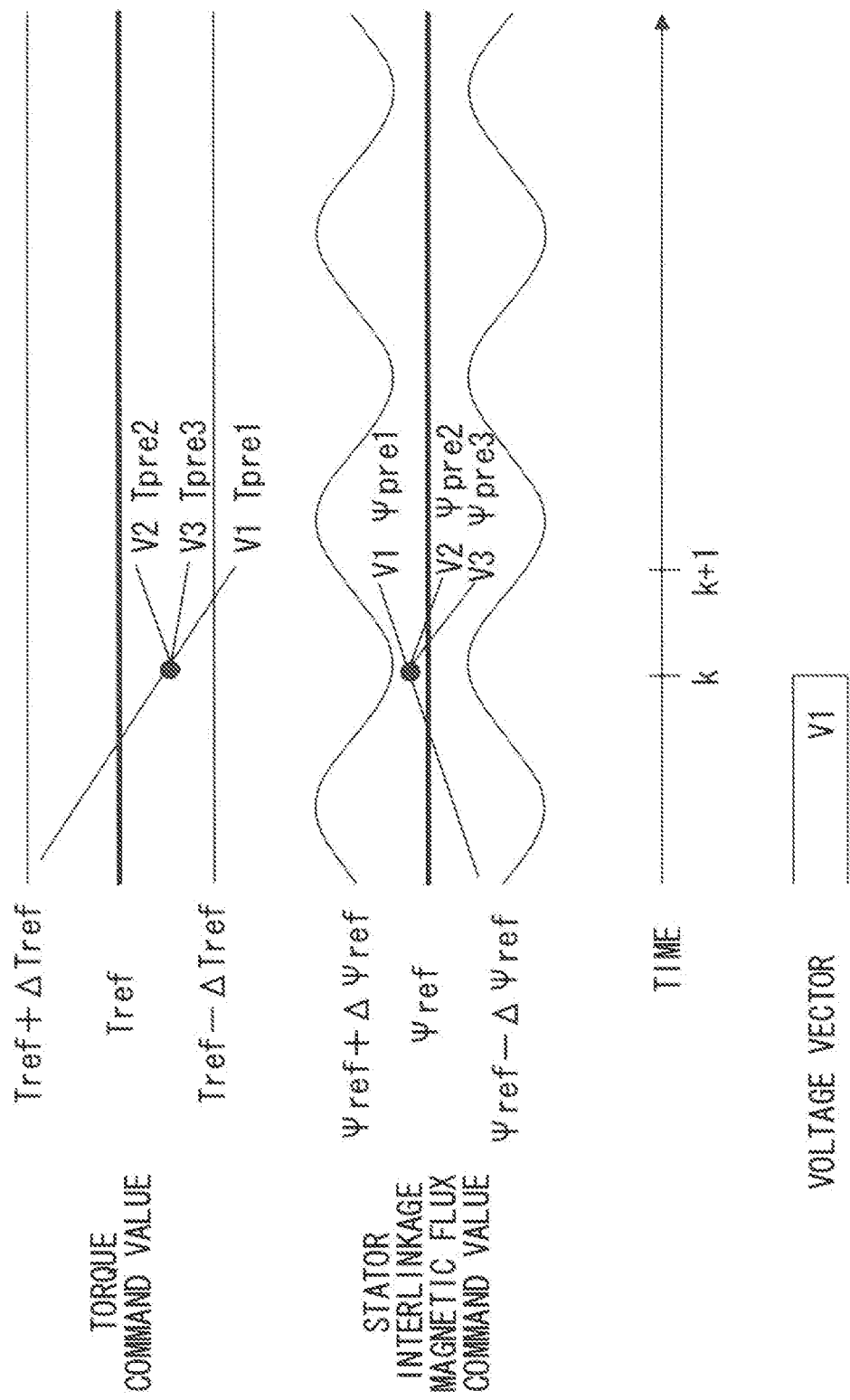
FIG. 12 is a diagram for explaining a model prediction by the switching state determination unit of the power conversion device according to Embodiment 2 of the present invention.

As shown in FIG. 12, the state prediction unit 31 calculates, for the output of each switching state (voltage vector), a next-cycle prediction torque Tpre and a next-cycle prediction stator interlinkage magnetic flux $\Psi$pre with use of an electric motor calculation model expression known from the torque Te and the stator interlinkage magnetic flux $\Psi$e at the present time (represented by time k), the phase $\theta$e of the stator interlinkage magnetic flux, and the rotation speed Wre of the rotary electric machine 3 detected by the speed detector 4.

Here, although FIG. 12 shows the loci for only three voltage vectors (V1, V2, and V3) for simplification, the calculation is ordinarily performed for all of the voltage vectors V0 to V7.

Then, the prediction value extension unit 32 compares the prediction torque Tpre and the prediction stator interlinkage magnetic flux $\Psi$pre, which are calculated by the state prediction unit 31, respectively with the limitation range-provided torque command value Tref±$\Delta$Tref and the limitation range-provided stator interlinkage magnetic flux command value $\Psi$ref±$\Delta\Psi$ref which are generated by the limitation range-provided command value generation unit 15, and eliminates the loci for any voltage vector at which either the torque or the stator interlinkage magnetic flux is outside the corresponding limitation range.

For FIG. 12, the prediction torque Tpre1 at the voltage vector V1 is outside the limitation range-provided torque command value Tref±$\Delta$Tref at a time k+1, and thus the loci for the voltage vector V1 is eliminated.

Figure 13:
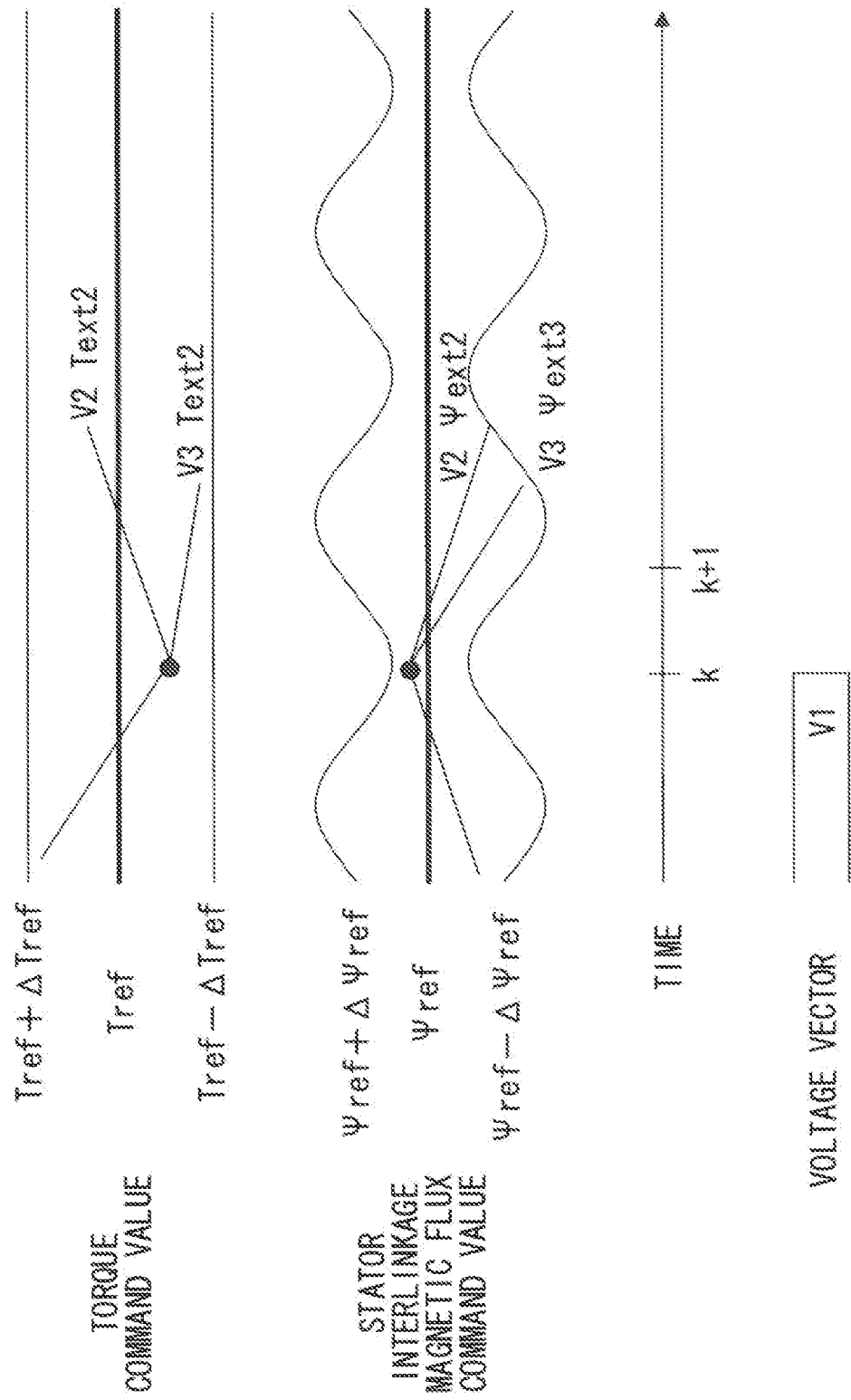
FIG. 13 is a diagram for explaining the model prediction by the switching state determination unit of the power conversion device according to Embodiment 2 of the present invention.

Meanwhile, in cases where both prediction values are within the limitation ranges such as a case where the voltage vector V2 or V3 is selected, an extension torque Text and an extension stator interlinkage magnetic flux $\Psi$ext obtained when, as shown in FIG. 13, the prediction values are temporally extended until reaching the limitation ranges, are calculated.

Lastly, the switching state selection unit 33 calculates an evaluation value from the length of the locus of each of the extension torque Text and the extension stator interlinkage magnetic flux $\Psi$ext obtained through the extension by the prediction value extension unit 32, and a corresponding switching state.

Specifically, for each voltage vector, (the length of the locus therefor/the number of times of switching) is calculated as the evaluation value. Here, the number of times of switching is the total of switching changes in the U phase, V phase, and W phase. For example, in FIG. 13, a change from the voltage vector V1 (100) to the voltage vector V2 (110) is counted as one time, and a change from the voltage vector V1 (100) to the voltage vector V3 (010) is counted as two times.

A switching state at which the evaluation value becomes maximum is optimal. The switching state selection unit 33 selects the optimal switching state Suvw, and the switching state determination unit 16a outputs the optimal switching state Suvw.

Figure 14:
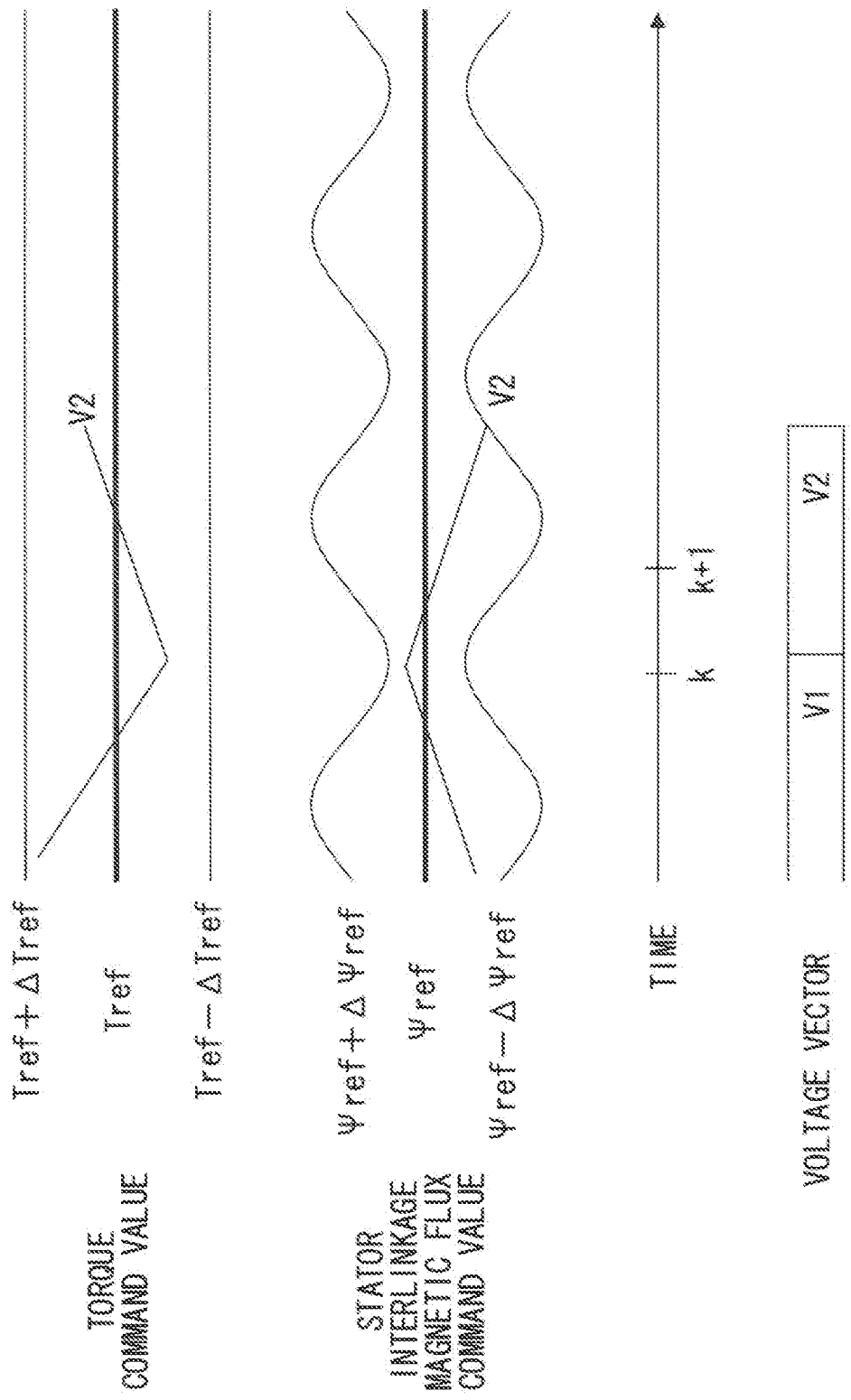
FIG. 14 is a diagram for explaining the model prediction by the switching state determination unit of the power conversion device according to Embodiment 2 of the present invention.

That is, in FIG. 14, the voltage vector V2 is selected from between the voltage vectors V2 and V3 in FIG. 13 and outputted.

In Embodiment 2, the optimal switching state is selected from among all the switching states with respect to the limitation range-provided command value obtained by adding a temporal change to the limitation range generated by the limitation range-provided command value generation unit 15. Accordingly, reduction in the switching frequency is also achieved in addition to the advantageous effect of Embodiment 1, i.e., the inhibition of an error relative to the command value.

As the electric motor calculation model used in the state prediction unit 31, a rotary electric machine calculation model is used that corresponds to the type of the rotary electric machine to be used.

As described above, the power conversion device according to Embodiment 2 is configured such that the switching state determination unit calculates loci for each voltage vector with use of the electric motor calculation model expression, calculates an evaluation value in consideration of the number of times of switching, and selects a switching state (voltage vector) at which the evaluation value becomes maximum.

Therefore, with the power conversion device according to Embodiment 2, it is possible to inhibit errors between the command values and output values from occurring owing to variations, in the pulsating quantities of the control amounts, that occur according to the driving condition of the rotary electric machine, and it is possible to suppress increase in the switching frequency by avoiding occurrence of such errors without narrowing the limitation ranges for the pulsations. In addition, because the optimal switching state can be selected, reduction in the switching frequency can also be achieved.

Embodiment 3

A power conversion device according to Embodiment 3 is configured such that currents in the rotary electric machine are used as the control amounts, currents in a rotating coordinate system or a stationary coordinate system are calculated with use of the phase of a rotor interlinkage magnetic flux calculated by the phase calculation unit, and the optimal switching state is determined with use of an electric motor calculation model expression on the basis of the currents, the phase of the rotor interlinkage magnetic flux, and the rotation speed of the rotary electric machine.

Figure 15:
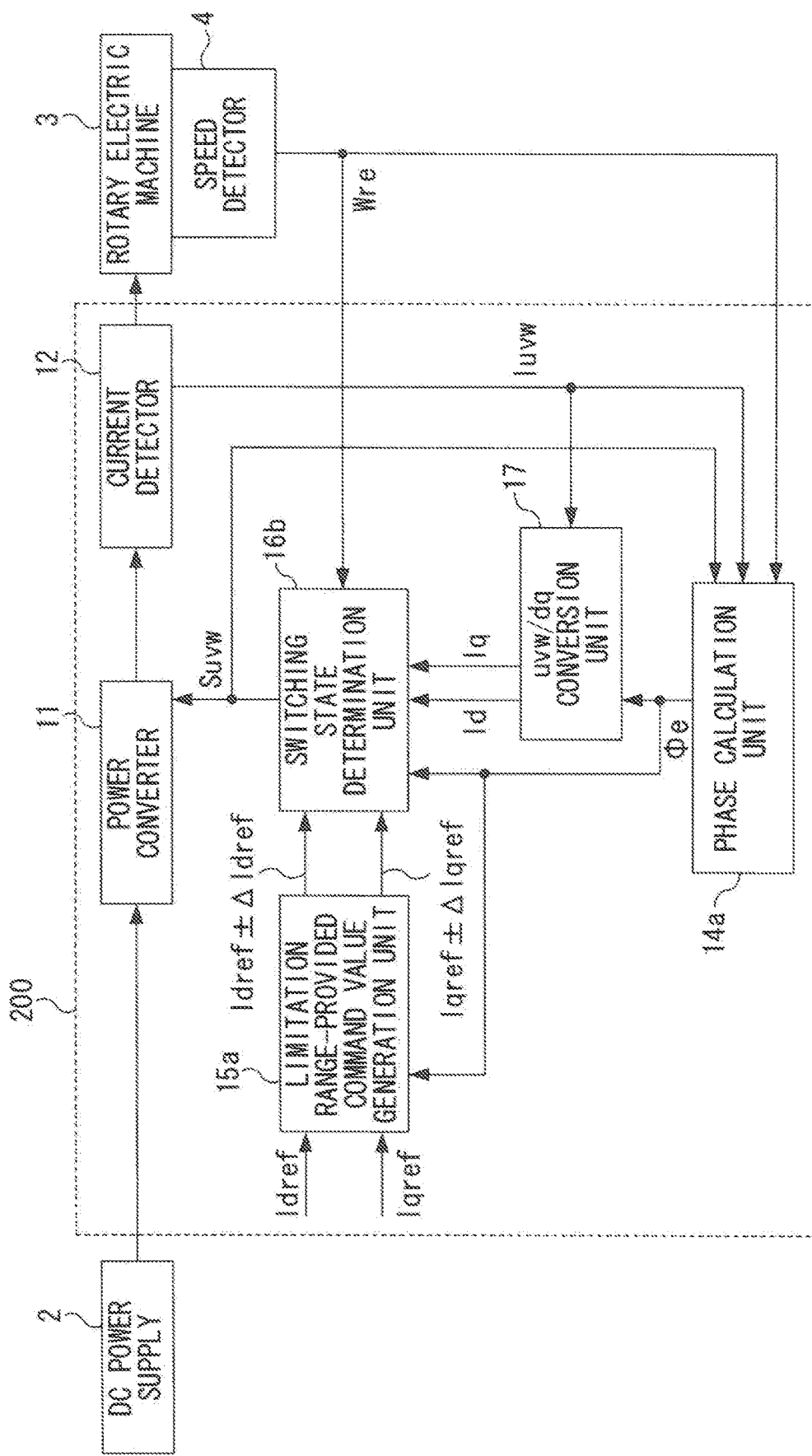
FIG. 15 is a function block diagram of a power conversion device according to Embodiment 3 of the present invention.

Hereinafter, the power conversion device according to Embodiment 3 will be described focusing on differences from Embodiment 1 with reference to FIG. 15 and FIG. 17 which are each a function block diagram of the power conversion device, and FIG. 16 which is an internal block diagram of the switching state determination unit. In FIG. 15 and FIG. 17, parts that are the same as or correspond to those in FIG. 1 for Embodiment 1 are denoted by the same reference characters.

The power conversion device, the phase calculation unit, the limitation range-provided command value generation unit, and the switching state determination unit are denoted by 200 or 200a, 14a, 15a or 15b, and 16b, respectively, for discrimination from those in the embodiments. The control amount calculation unit 13 in Embodiment 1 is not provided.

The differences between a power conversion device 200 according to Embodiment 3 and the power conversion device 1 according to Embodiment 1 will be described. The phase calculation unit 14 is replaced by a phase calculation unit 14a, the limitation range-provided command value generation unit 15 is replaced by a limitation range-provided command value generation unit 15a, and the switching state determination unit 16 is replaced by a switching state determination unit 16b. In addition, the speed detector 4 and an uvw/dq conversion unit 17 are additionally provided, and the control amount calculation unit 13 is not provided. The other constituent blocks are the same as those in FIG. 1 for Embodiment 1, and thus description thereof is omitted. In addition, the speed detector 4 is the same as that in Embodiment 2, and thus description thereof is omitted.

In Embodiment 1, the switching state determination unit 16 determines a switching state to be outputted next, on the basis of the difference $\delta T$ between the torque Te and the torque command value Tref, the limitation range $\Delta$Tref for the torque command value, the difference $\delta\Psi$ between the stator interlinkage magnetic flux $\Psi$e and the stator interlinkage magnetic flux command value $\Psi$ref, the limitation range $\Delta\Psi$ref for the stator interlinkage magnetic flux command value, and the phase $\theta e$ of the stator interlinkage magnetic flux.

In Embodiment 3, currents in the rotary electric machine 3 are used as the control amounts instead of the torque Te and the stator interlinkage magnetic flux $\Psi$e, currents Id and Iq in a rotating coordinate system are calculated with use of a phase $\Phi e$ of a rotor interlinkage magnetic flux calculated by the phase calculation unit 14a, and a switching state Suvw is determined on the basis of the currents Id and Iq.

In FIG. 15, the phase calculation unit 14a calculates the phase $\Phi e$ of the rotor interlinkage magnetic flux on the basis of the currents Iuvw detected by the current detector 12, the switching state Suvw determined by the switching state determination unit 16b, and the rotation speed Wre of the rotary electric machine 3 detected by the speed detector 4. The phase calculation unit 14a inputs the phase $\Phi e$ of the rotor interlinkage magnetic flux to the limitation range-provided command value generation unit 15a, the switching state determination unit 16b, and the uvw/dq conversion unit 17.

The uvw/dq conversion unit 17 calculates currents Id and Iq in the rotating coordinate system by performing coordinate conversion with use of the currents Iuvw detected by the current detector 12 and the phase $\Phi e$ of the rotor interlinkage magnetic flux calculated by the phase calculation unit 14a, and inputs the currents Id and Iq to the switching state determination unit 16b.

The limitation range-provided command value generation unit 15a generates limitation range-provided current command values Idref±ΔIdref and Iqref±ΔIqref relative to current command values Idref and Iqref in the rotating coordinate system with use of the phase Φe of the rotor interlinkage magnetic flux calculated by the phase calculation unit 14a, and inputs the limitation range-provided current command values Idref±ΔIdref and Iqref±ΔIqref to the switching state determination unit 16b.

Figure 16:
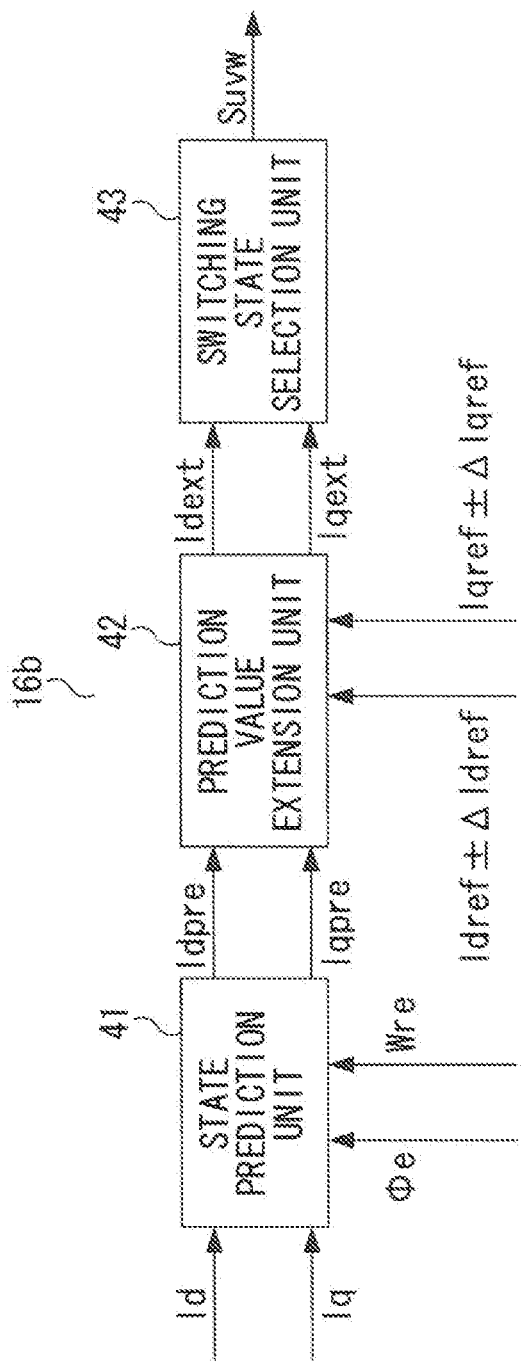
FIG. 16 is an internal block diagram of a switching state determination unit of the power conversion device according to Embodiment 3 of the present invention.
Figure 17:
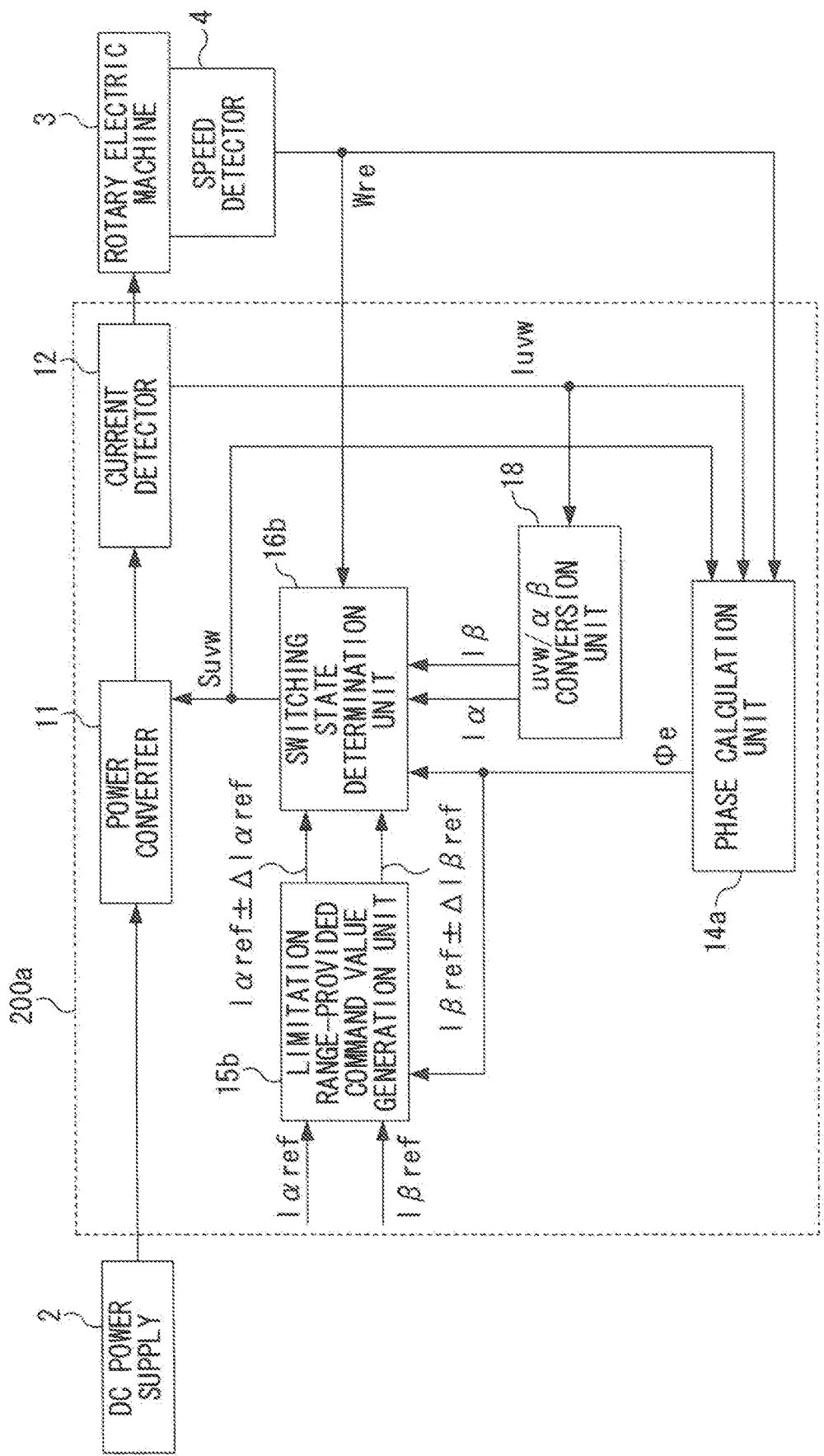
FIG. 17 is another function block diagram of the power conversion device according to Embodiment 3 of the present invention.

In Embodiment 3, as shown in the internal block diagram in FIG. 16, the switching state determination unit 16b includes a state prediction unit 41, a prediction value extension unit 42, and a switching state selection unit 43.

Although not shown, the functions and the operations of the units of the switching state determination unit 16b are the same as those of the state prediction unit 31, the prediction value extension unit 32, and the switching state selection unit 33 in Embodiment 2.

Specifically, first, the state prediction unit 41 calculates, for the output of each switching state (voltage vector), next-cycle prediction currents Idpre and Iqpre in the rotating coordinate system with use of an electric motor calculation model expression known from the currents Id and Iq in the rotating coordinate system, the phase Φe of the rotor interlinkage magnetic flux, and the rotation speed Wre of the rotary electric machine 3 detected by the speed detector 4.

The calculation is performed for all of the voltage vectors from V0 to V7.

Then, the prediction value extension unit 42 compares the prediction currents Idpre and Iqpre, which are calculated by the state prediction unit 41, respectively with the limitation range-provided current command values Idref±ΔIdref and Iqref±ΔIqref generated by the limitation range-provided command value generation unit 15a, and eliminates the loci for any voltage vector at which either of the prediction currents Idpre and Iqpre is outside the corresponding limitation range. Meanwhile, in cases where both prediction currents are within the limitation ranges, extension prediction currents Idext and Iqext obtained when the prediction currents are temporally extended until reaching the limitation ranges, are calculated.

Lastly, the switching state selection unit 43 calculates an evaluation value from the length of the locus of each of the prediction currents Idext and Iqext obtained through the extension by the prediction value extension unit 42, and a corresponding switching state.

As described in Embodiment 2, for each voltage vector, (the length of the locus therefor/the number of times of switching) is calculated as the evaluation value. The switching state selection unit 43 selects a switching state Suvw at which the evaluation value becomes maximum. The switching state determination unit 16b outputs the selected switching state Suvw.

Alternatively, Embodiment 3 may be configured as in FIG. 17. The power conversion device 200 in FIG. 15 and a power conversion device 200a in FIG. 17 are different from each other in that the uvw/dq conversion unit 17 is replaced by an uvw/αβ conversion unit 18 and the limitation range-provided command value generation unit 15b is provided.

In the power conversion device 200 (FIG. 15), the currents Iuvw in the rotary electric machine 3 detected by the current detector 12 are converted into the currents Id and Iq in the rotating coordinate system, and the currents Id and Iq are inputted to the switching state determination unit 16b.

In contrast, in the power conversion device 200a (FIG. 17), the currents Iuvw in the rotary electric machine 3 detected by the current detector 12 are converted into currents Iα and Iβ in a stationary coordinate system, and the currents Iα and Iβ are inputted to the switching state determination unit 16b.

Accordingly, the command values inputted to the limitation range-provided command value generation unit 15b are current command values Iαref and Iβref in the stationary coordinate system. Similarly, the limitation range-provided command values outputted from the limitation range-provided command value generation unit 15b are limitation range-provided current command values Iαref±ΔIαref and Iβref±ΔIβref in the stationary coordinate system.

Also in the power conversion device 200a, the function and the operation of the switching state determination unit 16b are the same as those in the case where the currents Id and Iq in the rotating coordinate system are used. Specifically, the switching state determination unit 16b determines the optimal switching state Suvw with use of the currents Iα and Iβ in the stationary coordinate system.

In Embodiment 3, because currents in the rotary electric machine are directly controlled, it is possible to effectively suppress a current harmonic component and an error from each current command value in consideration of pulsations of the currents. Furthermore, because the optimal switching state can be selected with use of the electric motor calculation model, reduction in the switching frequency can be achieved.

As described above, the power conversion device according to Embodiment 3 is configured such that currents in the rotary electric machine are used as the control amounts, currents in the rotating coordinate system or the stationary coordinate system are calculated with use of the phase of the rotor interlinkage magnetic flux calculated by the phase calculation unit, and the optimal switching state is determined with use of the electric motor calculation model expression on the basis of the currents, the phase of the rotor interlinkage magnetic flux, and the rotation speed of the rotary electric machine. Therefore, with the power conversion device according to Embodiment 3, it is possible to inhibit errors between the command values and output values from occurring owing to variations, in the pulsating quantities of the control amounts, that occur according to the driving condition of the rotary electric machine, and it is possible to suppress increase in the switching frequency by avoiding occurrence of such errors without narrowing the limitation ranges for the pulsations.

In addition, because currents in the rotary electric machine are directly controlled, it is possible to effectively suppress a current harmonic component and an error from each current command value. Furthermore, because the optimal switching state can be selected, reduction in the switching frequency can also be achieved.

Embodiment 4

A power conversion device according to Embodiment 4 is configured such that the torque and the stator interlinkage magnetic flux which are the control amounts are inputted to the limitation range-provided command value generation unit, and the limitation range of the limitation range-provided command value for either of the control amounts is temporally changed on the basis of the slope of the locus of the control amount.

Figure 18:
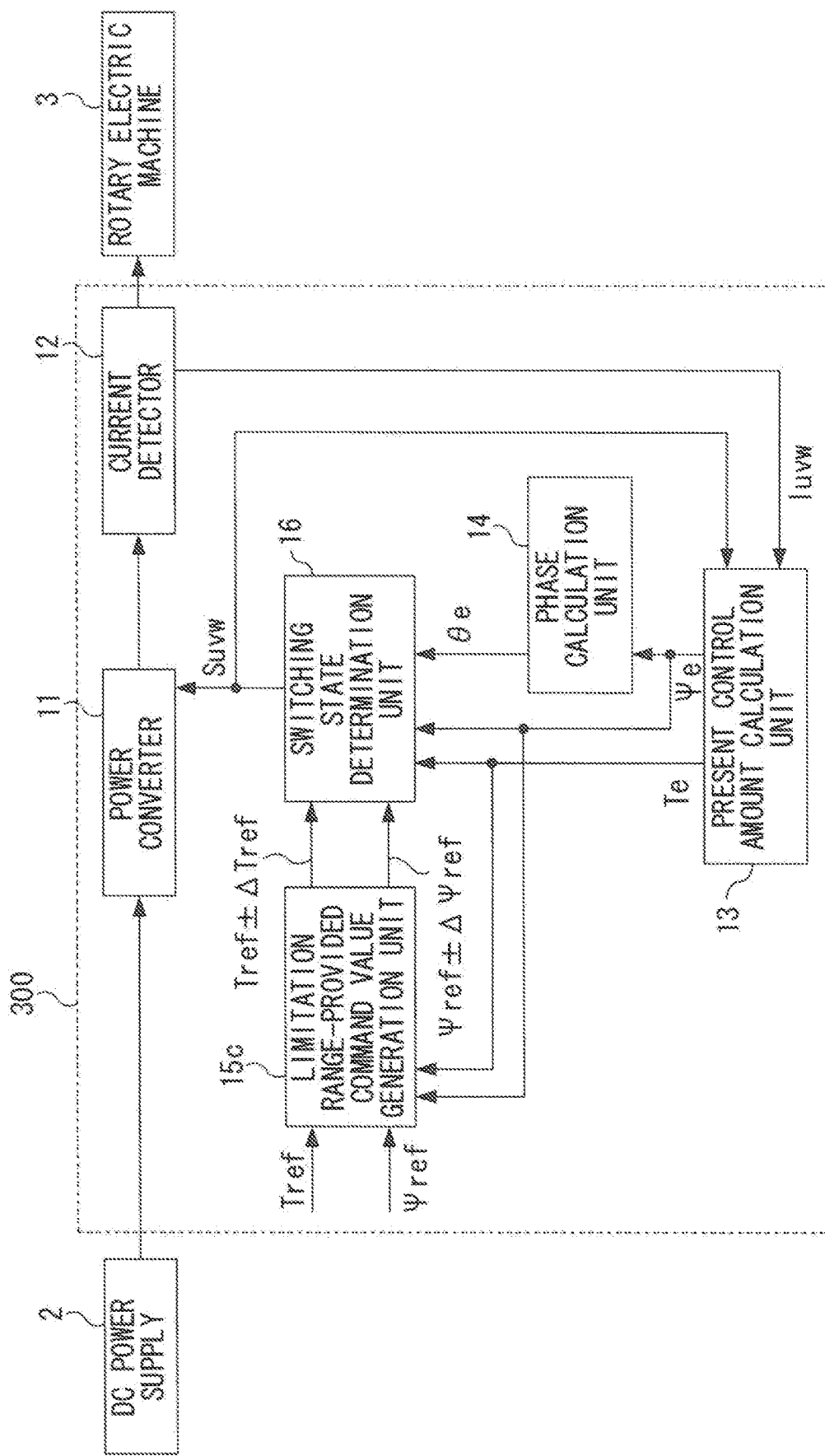
FIG. 18 is a function block diagram of a power conversion device according to Embodiment 4 of the present invention.

Hereinafter, the power conversion device according to Embodiment 4 will be described focusing on differences from Embodiment 1 with reference to FIG. 18 which is a function block diagram of the power conversion device, and FIG. 19 which is a diagram indicating examples of the limitation range-provided command value relative to the command value for the control amount. In FIG. 18, parts that are the same as or correspond to those in FIG. 1 for Embodiment 1 are denoted by the same reference characters.

The power conversion device and the limitation range-provided command value generation unit are denoted by 300 and 15c, respectively, for discrimination from those in Embodiment 1.

The differences in configuration between a power conversion device 300 according to Embodiment 4 and the power conversion device 1 according to Embodiment 1 is that the limitation range-provided command value generation unit 15 is replaced by a limitation range-provided command value generation unit 15c. The other constituent blocks are the same as those in Embodiment 1, and thus description thereof is omitted.

In Embodiment 1, the limitation range-provided command value generation unit 15 temporally changes the limitation range of the limitation range-provided command value for either of the control amounts with use of the phase θe of the stator interlinkage magnetic flux.

In Embodiment 4, the limitation range-provided command value generation unit 15c receives, instead of the phase θe of the stator interlinkage magnetic flux, the torque Te and the stator interlinkage magnetic flux Ψe, and temporally changes the limitation range of the limitation range-provided command value for the control amount on the basis of the locus of the control amount.

A specific example will be described with reference to FIG. 19. In FIG. 19, "A" means "the slope is becoming steep", and "B" means that "the slope is becoming gentle".

Figure 19:
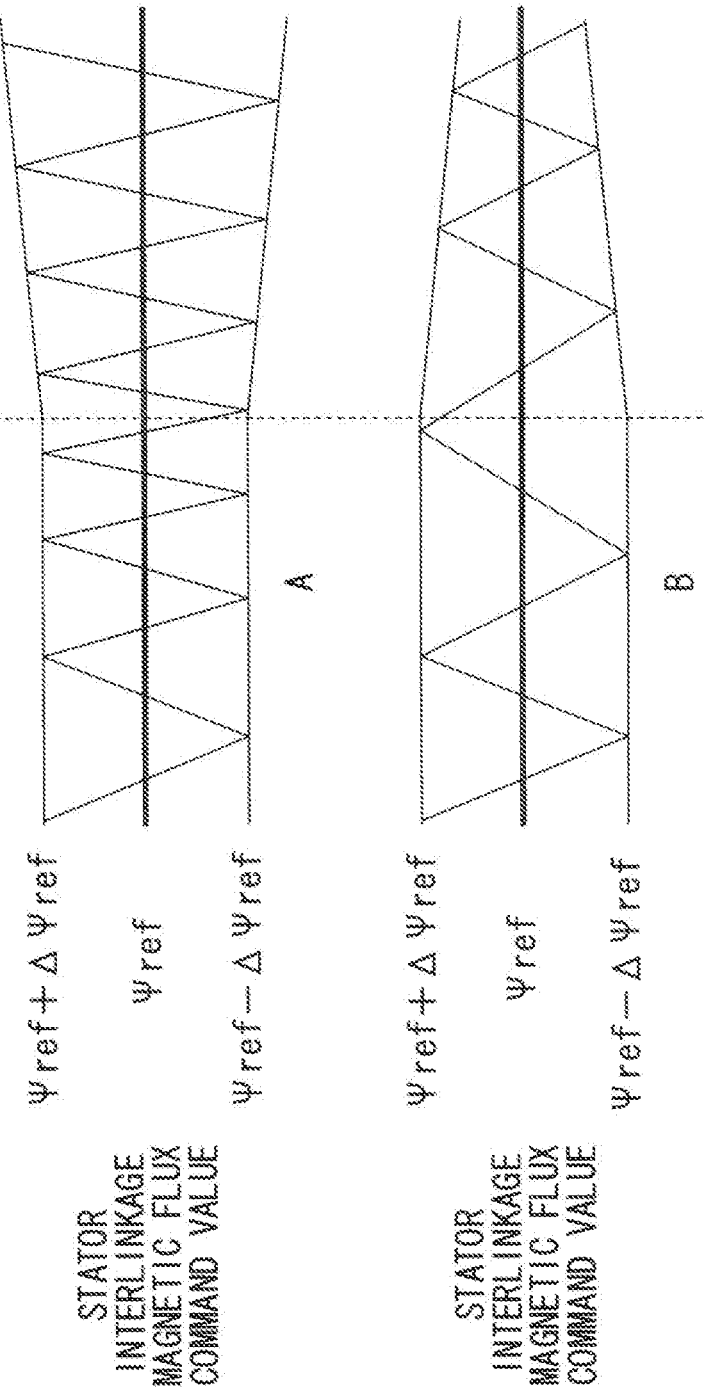
FIG. 19 is a diagram indicating examples of a limitation range-provided command value relative to a command value for a control amount in the power conversion device according to Embodiment 4 of the present invention.

In FIG. 19, when the slope of the locus of the stator interlinkage magnetic flux Ψe tends to become steep during a predetermined time until the timing of detection, the limitation range ΔΨref of the limitation range-provided command value for the stator interlinkage magnetic flux is widened. On the contrary, when the slope of the locus tends to become gentle, the limitation range ΔΨref for the stator interlinkage magnetic flux is narrowed.

In Embodiment 4, because the limitation range of the limitation range-provided command value is temporally changed on the basis of the slope of the locus of the control amount, the limitation range of the limitation range-provided command value can be changed on the basis of the driving condition of the rotary electric machine so as to directly reflect a change in the pulsation of the control amount.

The present Embodiment 4 has been described based on an example in which the limitation range of the limitation range-provided command value for the stator interlinkage magnetic flux as the control amount is temporally changed on the basis of the change in the slope of the locus of the stator interlinkage magnetic flux. However, the limitation range of the limitation range-provided command value for torque or current (current in the rotating coordinate system or current in the stationary coordinate system) as the control amount may be temporally changed.

As described above, the power conversion device according to Embodiment 4 is configured such that the torque and the stator interlinkage magnetic flux are inputted to the limitation range-provided command value generation unit, and the limitation range of the limitation range-provided command value for either of the control amounts is temporally changed on the basis of the slope of the locus of the control amount. Therefore, with the power conversion device according to Embodiment 4, it is possible to inhibit errors between the command values and output values from occurring owing to variations, in the pulsating quantities of the control amounts, that occur according to the driving condition of the rotary electric machine, and it is possible to suppress increase in the switching frequency by avoiding occurrence of such errors without narrowing the limitation ranges for the pulsations. In addition, because the driving condition of the rotary electric machine is calculated from the slope of the locus of the control amount, the limitation range of the limitation range-provided command value can be changed so as to directly reflect a change in the pulsation of the control amount.

It is noted that, within the scope of the present invention, the above embodiments may be freely combined with each other, or each of the above embodiments may be modified or simplified as appropriate.

INDUSTRIAL APPLICABILITY

In the present invention, the limitation range of at least one of the limitation range-provided command values is temporally changed on the basis of the driving condition of the rotary electric machine, and thus it is possible to suppress increase in the switching frequency without narrowing the limitation range for the pulsation. Therefore, the present invention is widely applicable to direct torque control type power conversion devices.

DESCRIPTION OF THE REFERENCE CHARACTERS 1, 100, 200, 200a, 300 power conversion device
2 DC power supply
3 rotary electric machine
4 speed detector
11 power converter
12 current detector
13 control amount calculation unit
14, 14a phase calculation unit
15, 15a, 15b, 15c limitation range-provided command value generation unit
16, 16a, 16b switching state determination unit
17 uvw/dq conversion unit
18 uvw/αβ conversion unit
21, 22 subtractor
23 torque comparator
24 magnetic flux comparator
25 switching table
31, 41 state prediction unit
32, 42 prediction value extension unit
33, 43 switching state selection unit
50 processor
51 storage device
Sa0, Sa1, Sb0, Sb1, Sc0, Sc1 switching element

The invention claimed is:

1. A power conversion device comprising a power converter which supplies power that drives a rotary electric machine by a switching operation of a switch, the power conversion device further comprising a controller for the power converter, the controller comprising:
control amount calculation circuitry configured to calculate two or more control amounts each indicating a driving condition of the rotary electric machine on the basis of output current from the power converter and a switching state of the switch of the power converter;
limitation range-provided command value generation circuitry configured to generate limitation range-provided command values including limitation ranges for pulsations of the control amounts relative to command values for the control amounts; and switching state determination circuitry configured to determine a switching state on the basis of each control amount and the corresponding limitation range-provided command value such that the control amount falls within the limitation range of the limitation range-provided command value, wherein, for at least one of the limitation range-provided command values, the limitation range of the limitation range-provided command value is temporally changed on the basis of the driving condition of the rotary electric machine, wherein the limitation range-provided command value generation circuitry:

calculates the driving condition of the rotary electric machine from a phase of a stator interlinkage magnetic flux which is one of the control amounts, and temporally changes the limitation range of the corresponding limitation range-provided command value on the basis of the driving condition of the rotary electric machine.

2. The power conversion device according to claim 1, wherein the control amounts of the rotary electric machine are a torque and a stator interlinkage magnetic flux of the rotary electric machine.

3. The power conversion device according to claim 2, wherein the switching state determination circuitry:

uses a rotary electric machine calculation model expression for the control amounts to calculate, for each of voltage vectors corresponding to switching states, a locus of each control amount and a number of times of switching, the locus being extended from a sampling point until reaching the limitation range of the corresponding limitation range-provided command value, calculates a length of the locus/the number of times of switching as an evaluation value, and determines the switching state at which the evaluation value becomes maximum.

4. The power conversion device according to claim 1, wherein the control amounts of the rotary electric machine are currents in a two-axis orthogonal rotating coordinate system in the rotary electric machine.

5. The power conversion device according to claim 4, wherein the switching state determination circuitry:

uses a rotary electric machine calculation model expression for the control amounts to calculate, for each of voltage vectors corresponding to switching states, a locus of each control amount and a number of times of switching, the locus being extended from a sampling point until reaching the limitation range of the corresponding limitation range-provided command value, calculates a length of the locus/the number of times of switching as an evaluation value, and determines the switching state at which the evaluation value becomes maximum.

6. The power conversion device according to claim 1, wherein the control amounts of the rotary electric machine are currents in a two-axis orthogonal stationary coordinate system in the rotary electric machine.

7. The power conversion device according to claim 6, wherein the switching state determination circuitry:

uses a rotary electric machine calculation model expression for the control amounts to calculate, for each of voltage vectors corresponding to switching states, a locus of each control amount and a number of times of switching, the locus being extended from a sampling point until reaching the limitation range of the corresponding limitation range-provided command value, calculates a length of the locus/the number of times of switching as an evaluation value, and determines the switching state at which the evaluation value becomes maximum.

8. The power conversion device according to claim 1, wherein the switching state determination circuitry;

uses a rotary electric machine calculation model expression for the control amounts to calculate, for each of voltage vectors corresponding to switching states, a locus of each control amount and a number of times of switching, the locus being extended from a sampling point until reaching the limitation range of the corresponding limitation range-provided command value, calculates a length of the locus/the number of times of switching as an evaluation value, and determines the switching state at which the evaluation value becomes maximum.

9. A power conversion device comprising a power converter which supplies power that drives a rotary electric machine by a switching operation of a switch, the power conversion device further comprising a controller for the power converter, the controller comprising:

control amount calculation circuitry configured to calculate two or more control amounts each indicating a driving condition of the rotary electric machine on the basis of output current from the power converter and a switching state of the switch of the power converter;

limitation range-provided command value generation circuitry configured to generate limitation range-provided command values including limitation ranges for pulsations of the control amounts relative to command values for the control amounts; and switching state determination circuitry configured to determine a switching state on the basis of each control amount and the corresponding limitation range-provided command value such that the control amount falls within the limitation range of the limitation range-provided command value, wherein, for at least one of the limitation range-provided command values, the limitation range of the limitation range-provided command value is temporally changed on the basis of the driving condition of the rotary electric machine, wherein the limitation range-provided command value generation circuitry:

calculates the driving condition of the rotary electric machine from a slope of a locus of either of the control amounts, and temporally changes the limitation range of the corresponding limitation range-provided command value on the basis of the driving condition of the rotary electric machine.

10. The power conversion device according to claim 9, wherein the switching state determination circuitry;

uses a rotary electric machine calculation model expression for the control amounts to calculate, for each of voltage vectors corresponding to switching states, a locus of each control amount and a number of times of switching, the locus being extended from a sampling point until reaching the limitation range of the corresponding limitation range-provided command value, calculates a length of the locus/the number of times of switching as an evaluation value, and determines the switching state at which the evaluation value becomes maximum.

11. The power conversion device according to claim 9, wherein the control amounts of the rotary electric machine are a torque and a stator interlinkage magnetic flux of the rotary electric machine.

12. The power conversion device according to claim 11, wherein the switching state determination circuitry:
uses a rotary electric machine calculation model expression for the control amounts to calculate, for each of voltage vectors corresponding to switching states, a locus of each control amount and a number of times of switching, the locus being extended from a sampling point until reaching the limitation range of the corresponding limitation range-provided command value,
calculates a length of the locus/the number of times of switching as an evaluation value, and
determines the switching state at which the evaluation value becomes maximum.

13. The power conversion device according to claim 9, wherein the control amounts of the rotary electric machine are currents in a two-axis orthogonal rotating coordinate system in the rotary electric machine.

14. The power conversion device according to claim 13, wherein the switching state determination circuitry:
uses a rotary electric machine calculation model expression for the control amounts to calculate, for each of voltage vectors corresponding to switching states, a locus of each control amount and a number of times of switching, the locus being extended from a sampling point until reaching the limitation range of the corresponding limitation range-provided command value,
calculates a length of the locus/the number of times of switching as an evaluation value, and
determines the switching state at which the evaluation value becomes maximum.

15. The power conversion device according to claim 9, wherein the control amounts of the rotary electric machine are currents in a two-axis orthogonal stationary coordinate system in the rotary electric machine.

16. The power conversion device according to claim 15, wherein the switching state determination circuitry:
uses a rotary electric machine calculation model expression for the control amounts to calculate, for each of voltage vectors corresponding to switching states, a locus of each control amount and a number of times of switching, the locus being extended from a sampling point until reaching the limitation range of the corresponding limitation range-provided command value,
calculates a length of the locus/the number of times of switching as an evaluation value, and
determines the switching state at which the evaluation value becomes maximum.

17. A power conversion device comprising a power converter which supplies power that drives a rotary electric machine by a switching operation of a switch, the power conversion device further comprising a controller for the power converter, the controller comprising:
control amount calculation circuitry configured to calculate two or more control amounts each indicating a driving condition of the rotary electric machine on the basis of output current from the power converter and a switching state of the switch of the power converter;
limitation range-provided command value generation circuitry configured to generate limitation range-provided command values including limitation ranges for pulsations of the control amounts relative to command values for the control amounts; and
switching state determination circuitry configured to determine a switching state on the basis of each control amount and the corresponding limitation range-provided command value such that the control amount falls within the limitation range of the limitation range-provided command value, wherein,
for at least one of the limitation range-provided command values, the limitation range of the limitation range-provided command value is temporally changed on the basis of the driving condition of the rotary electric machine,
wherein the limitation range-provided command value generation circuitry:
calculates the driving condition of the rotary electric machine from a phase of a rotor interlinkage magnetic flux which is one of the control amounts, and
temporally changes the limitation range of the corresponding limitation range-provided command value on the basis of the driving condition of the rotary electric machine.

* * * * *